United States Patent
Kim et al.

(10) Patent No.: US 10,465,761 B2
(45) Date of Patent: Nov. 5, 2019

(54) COIL SPRING PAD FOR VEHICLE SUSPENSION SYSTEM

(71) Applicant: DAEWON KANG UP CO., LTD., Cheonan-si, Chungcheongnam-do (KR)

(72) Inventors: Ha-Yun Kim, Seoul (KR); Bong-Soo Jun, Cheonan-si (KR); Jai-Shik Yi, Seoul (KR); Won-Yeong Kim, Seoul (KR)

(73) Assignee: DAEWON KANG UP CO., LTD., Cheonan-si, Chungcheon (KR)

( * ) Notice: Subject to any disclaimer, the term of this patent is extended or adjusted under 35 U.S.C. 154(b) by 0 days.

(21) Appl. No.: 15/765,326

(22) PCT Filed: Aug. 22, 2016

(86) PCT No.: PCT/KR2016/009249
§ 371 (c)(1),
(2) Date: Apr. 2, 2018

(87) PCT Pub. No.: WO2017/171154
PCT Pub. Date: Oct. 5, 2017

(65) Prior Publication Data
US 2018/0313421 A1 Nov. 1, 2018

(30) Foreign Application Priority Data
Apr. 1, 2016 (KR) .................. 10-2016-0040111

(51) Int. Cl.
*F16F 1/12* (2006.01)
*B60G 13/04* (2006.01)
(Continued)

(52) U.S. Cl.
CPC .............. *F16F 1/126* (2013.01); *B60G 11/16* (2013.01); *B60G 13/04* (2013.01);
(Continued)

(58) Field of Classification Search
CPC ........ B60G 11/16; B60G 13/04; B60G 11/22; B60G 15/06; B60G 2204/2422; F16F 1/126; F16F 9/32; F16F 1/122; F16F 9/54
(Continued)

(56) References Cited

U.S. PATENT DOCUMENTS

| | | | | |
|---|---|---|---|---|
| 6,155,544 A | * | 12/2000 | Solomond | B60G 11/52 267/170 |
| 7,416,175 B2 | * | 8/2008 | Al-Dahhan | B60G 11/15 267/140 |
| 2014/0265081 A1 | | 9/2014 | Nakano et al. | |

FOREIGN PATENT DOCUMENTS

| | | |
|---|---|---|
| JP | 2010-164071 A | 7/2010 |
| KR | 10-2013-0037957 A | 4/2013 |

(Continued)

OTHER PUBLICATIONS

International Search Report of PCT/KR2016/009249, dated Dec. 28, 2016.
Written Opinion of of PCT/KR2016/009249, dated Dec. 28, 2016.

*Primary Examiner* — Pamela Rodriguez

(57) ABSTRACT

The present invention relates to a coil spring pad for a vehicle suspension system, comprising: an accommodating groove (51) in which a lower end portion of a coil spring (10) is inserted and accommodated; and a pad extension part (55) which is formed from a first surface (35) of an upper surface (33) of a coil spring pad (31) and covers the whole section, except for a convexly raised portion and a through hole (73) of a lower seat (71), thereby preventing horizontal deformation of the coil spring pad (31).

6 Claims, 6 Drawing Sheets

(51) Int. Cl.
  *B60G 11/16*   (2006.01)
  *F16F 9/54*    (2006.01)
(52) U.S. Cl.
  CPC .... *B60G 2204/12422* (2013.01); *F16F 1/122* (2013.01); *F16F 9/54* (2013.01)
(58) Field of Classification Search
  USPC .......... 267/220, 221, 219, 179; 280/124.155
  See application file for complete search history.

(56) References Cited

FOREIGN PATENT DOCUMENTS

| | | | |
|---|---|---|---|
| KR | 10-2013-0135492 | A  | 12/2013 |
| KR | 10-1579924 | B1 | 12/2015 |
| KR | 10-1635809 | B1 | 7/2016 |

\* cited by examiner

COIL SPRING PAD FOR VEHICLE SUSPENSION SYSTEM

CROSS-REFERENCE TO RELATED APPLICATION

This application is the National Stage of International Application No. PCT/KR2016/009249 filed on Aug. 22, 2016, which claims the benefit of and priority to Korean Patent Application No. 10-2016-0040111 filed on Apr. 1, 2016, which are herein incorporated by reference in its entirety.

TECHNICAL FIELD

The present disclosure relates to a coil spring pad and, more specifically, to a coil spring pad for a vehicle suspension system, in which an upper surface of the coil spring pad for supporting a gap between a lower seat and a coil spring included in a vehicle suspension system is formed to be inclined downwards in the outer and inward directions, respectively, with reference to a coil spring accommodating groove. A pad extension part of the coil spring pad covers the whole area of the lower seat, except for through-holes and convex portions thereof, and has an inclined surface so that foreign substances can flow down without accumulating on the upper surface of the coil spring pad, and the pad extension part increases the contact area between the coil spring pad and the lower seat, thereby minimizing the amount of permanent deformation of the coil spring pad due to the operation of the coil spring and preventing tearing of the coil spring pad.

BACKGROUND ART

Generally, a vehicle suspension system is provided between a chassis and an axle for absorbing vibrations or impacts generated during traveling of a vehicle while supporting the weight of the vehicle and relieving vibrations or impacts transmitted to the vehicle and a driver, thereby improving ride comfort and securing driving stability of the vehicle.

Typically, the structure of the vehicle suspension system is configured such that an upper seat and a lower seat are installed in a shock absorber to be spaced apart from each other, a coil spring is provided between the upper seat and the lower seat installed in the shock absorber, and a coil spring pad is provided between the coil spring and the lower seat.

The shock absorber includes a cylinder and a piston rod, and a piston valve or the like is provided in the piston rod positioned inside the cylinder.

The coil spring is intended to attenuate vibrations and impacts along with the shock absorber, and is made by winding a thick steel wire in a spiral form. When an external force is applied to compress the shock absorber, the coil spring is compressed as well, and then the coil spring is restored by an elastic force.

An upper seat and a lower seat are provided at the upper and lower portions of the coil spring to receive and support the coil spring.

The lower seat is usually fixed to the outer circumferential surface of a cylinder of the shock absorber, and the upper seat is coupled to an end of the piston rod.

The coil spring pad is provided between the coil spring and the lower seat to prevent direct contact between the coil spring and the lower seat and to absorb and mitigate an impact generated between the coil spring and the lower seat, thereby preventing the lower seat from being damaged due to the operation of the coil spring.

Meanwhile, when a vehicle is running, the coil spring provided in the suspension system repeats compression and extension depending on the road surface condition, and this operation of the coil spring generates a clearance between the coil spring and the coil spring pad.

Further, in the state in which the clearance is generated, the repeated operation of the coil spring in the vertical direction causes the coil spring pad to be torn.

Therefore, Korean Patent Laid-Open Publication No. 10-2013-0135492 has proposed an improved lower spring structure. However, since the contact area between the coil spring and the coil spring pad is not big in the above spring structure, stress is concentrated on an accommodating groove of the coil spring pad. Thus, when the compression and extension of the spring are repeated, the pad may be permanently deformed in the vertical direction, which may cause tearing of the pad.

In addition, in the above spring structure, since the coil spring pad cannot cover the entire area of the lower seat, except for through-holes thereof, there is a problem in which dust collects on the lower seat as the vehicle travels and dust is not easily discharged through the through-holes.

In addition, Korean Patent Publication No. 10-1579924 has provided a spring pad for a suspension spring for preventing foreign substances from accumulating on the upper surface of the spring pad.

However, it is different for the above spring pad for a suspension spring to prevent the pad of the coil spring from being permanently deformed in the horizontal direction by a compression force repeatedly applied to the operating coil spring in the vertical direction.

Furthermore, when the compression and extension of the coil spring are repeated with respect to the spring pad for a suspension spring, the coil spring pad may be pushed outward to be thus permanently deformed in its shape.

DETAILED DESCRIPTION OF THE INVENTION

Technical Problem

The present disclosure has been made in order to solve the above problems, and an aspect of the present disclosure is to provide a coil spring pad for a vehicle suspension system, which secures a large area of the coil spring pad to maximize the contact area between the coil spring pad and the lower seat in order to prevent the coil spring pad from being permanently deformed and torn due to the repeated operation of the coil spring by improving the coil spring pad for supporting the coil spring used in a vehicle suspension system.

Another aspect of the present disclosure is to provide a coil spring pad that is able to prevent foreign substances from accumulating on the upper surface of the coil spring pad by adopting a surface formed to be inclined downwards in an outward direction with respect to an accommodating groove of the coil spring pad.

Technical Solution

According to an embodiment of the present disclosure, a coil spring pad for a vehicle suspension system may include: an accommodating groove 51 in which a lower end of a coil spring 10 is inserted and accommodated; and a pad extension part 55 that is formed from a first surface 35 on an upper surface 33 of the coil spring pad 31 so as to cover the whole area of a lower seat 71, except for through-holes 73 and convex portions of the lower seat 71, thereby preventing the coil spring pad 31 from being deformed in the horizontal direction.

In addition, a pad opening 57 of the pad extension part 55 may have a semi-circular or semi-elliptical shape corresponding to the shape of the through-hole 73 of the lower seat 71.

In addition, the pad extension part 55 of the coil spring pad 31 may be formed to be downwardly inclined toward the through-hole 73 based on the accommodating groove 51.

In addition, pad ends 53 of the coil spring pad 31 may be formed to be inclined downwards.

In addition, the coil spring 31 pad may further include pad fixing portions 59 for fixing the coil spring pad 31 to pad fixing holes 75 of the lower seat 71.

Further the coil spring pad 31 may further include lower grooves 61 providing a space for reducing the horizontal deformation of the coil spring pad 31 due to a compression force applied by the horizontal operation of the coil spring 10.

Advantageous Effects

According to the above coil spring pad for a vehicle suspension system of the present disclosure, it is possible to prevent the coil spring pad from being permanently deformed and torn in the horizontal direction due to the repeated compression and extension of the coil spring by securing a large area of the coil spring pad to maximize the contact area between the coil spring pad and the lower seat.

In addition, since an upper surface of the coil spring pad is formed to be inclined downwards in the outer and inward directions, respectively, based on a coil spring accommodating groove and a pad extension part is also formed with an inclined surface so as to cover the whole of an upper surface of a lower seat, except for through-holes and convex portions of the lower seat, foreign substances can directly flow down through the through-holes of the lower seat without accumulating on the upper surface of the coil spring pad.

MODE FOR CARRYING OUT THE INVENTION

Figure 1:
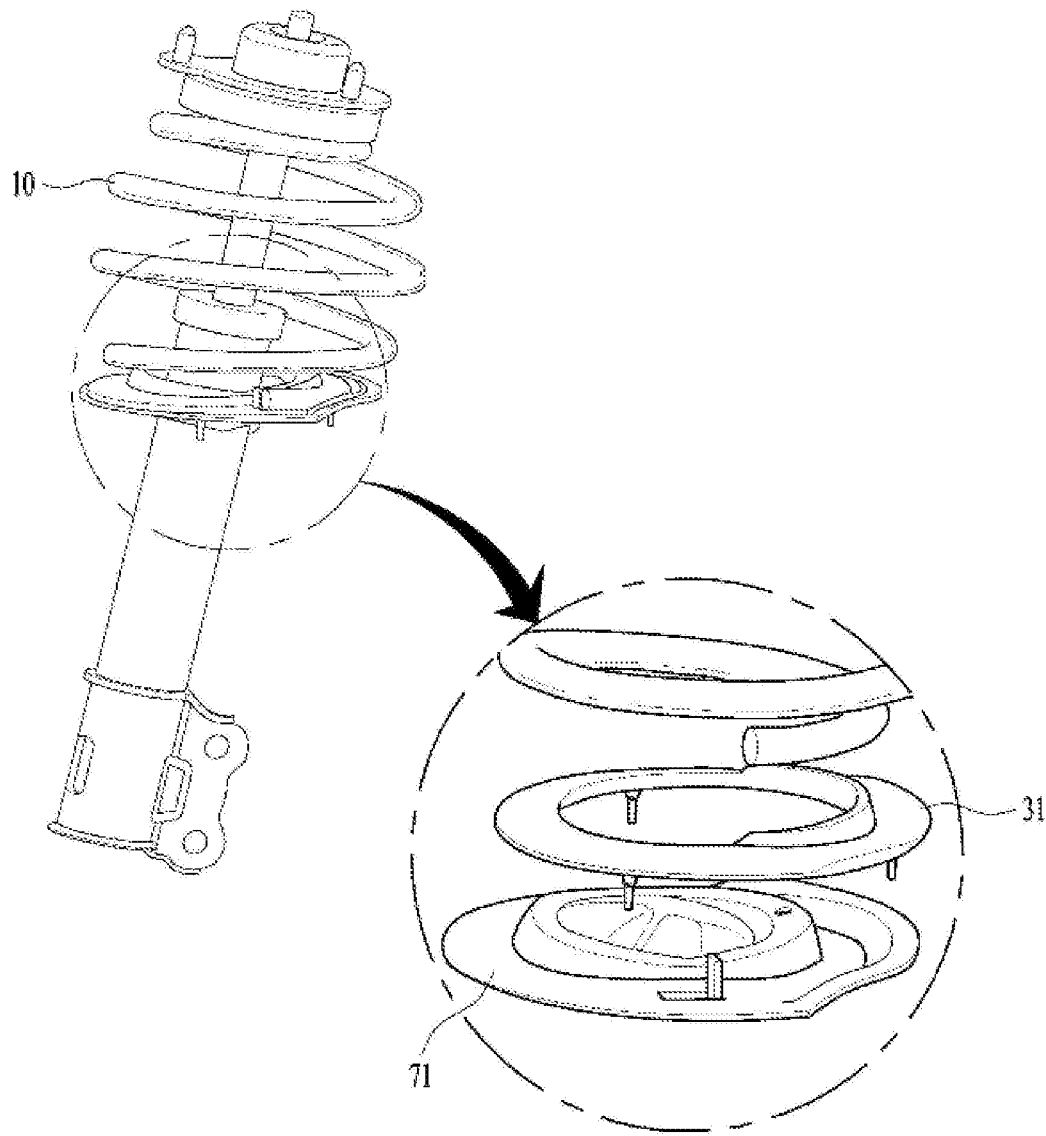
FIG. 1 is a structural view of a general suspension system.

It should be noted that technical terms used herein are merely for the purpose of describing specific embodiments and are not intended to limit the present disclosure.

In addition, the technical terms used herein should be interpreted as general meanings understood by those skilled in the art unless otherwise defined in the present specification, and should not be construed as being excessively broad or limited.

Furthermore, singular terms used herein include plural elements unless otherwise stated. In the present application, the term "comprising" or "including" used in the present application should not be construed as necessarily including all of the elements or steps described in the present specification, but may be interpreted to exclude some of the elements or steps or to further include additional elements or steps.

Like reference numerals refer to like elements throughout the present specification.

Hereinafter, a coil spring pad for a vehicle suspension system, according to an embodiment of the present disclosure, will be described with reference to FIGS. 1, 2, 3, 4, 5, and 6.

Figure 2:
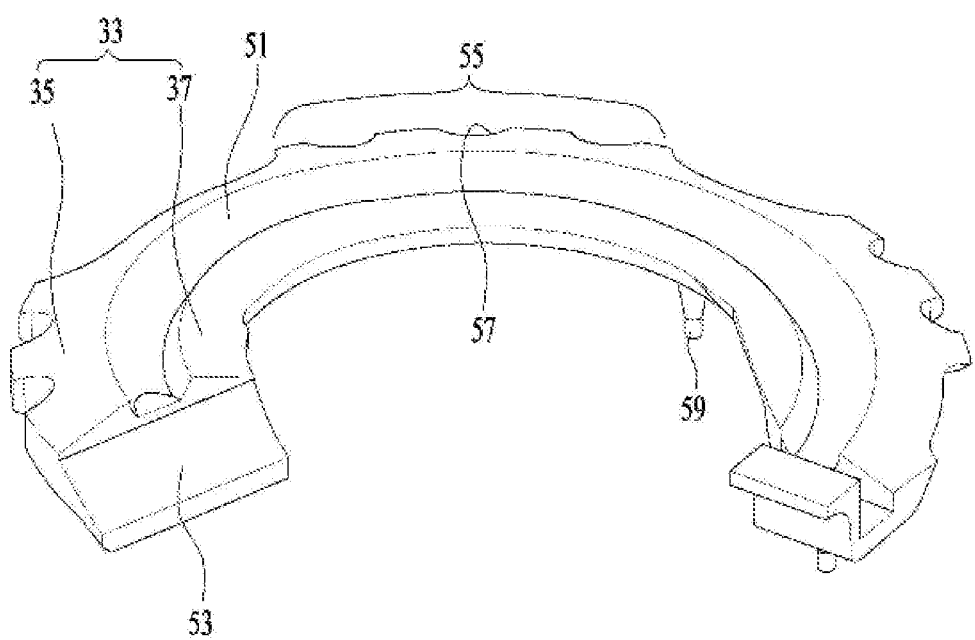
FIG. 2 is a perspective view of a coil spring pad 31 according to a preferred embodiment of the present disclosure.
Figure 3:
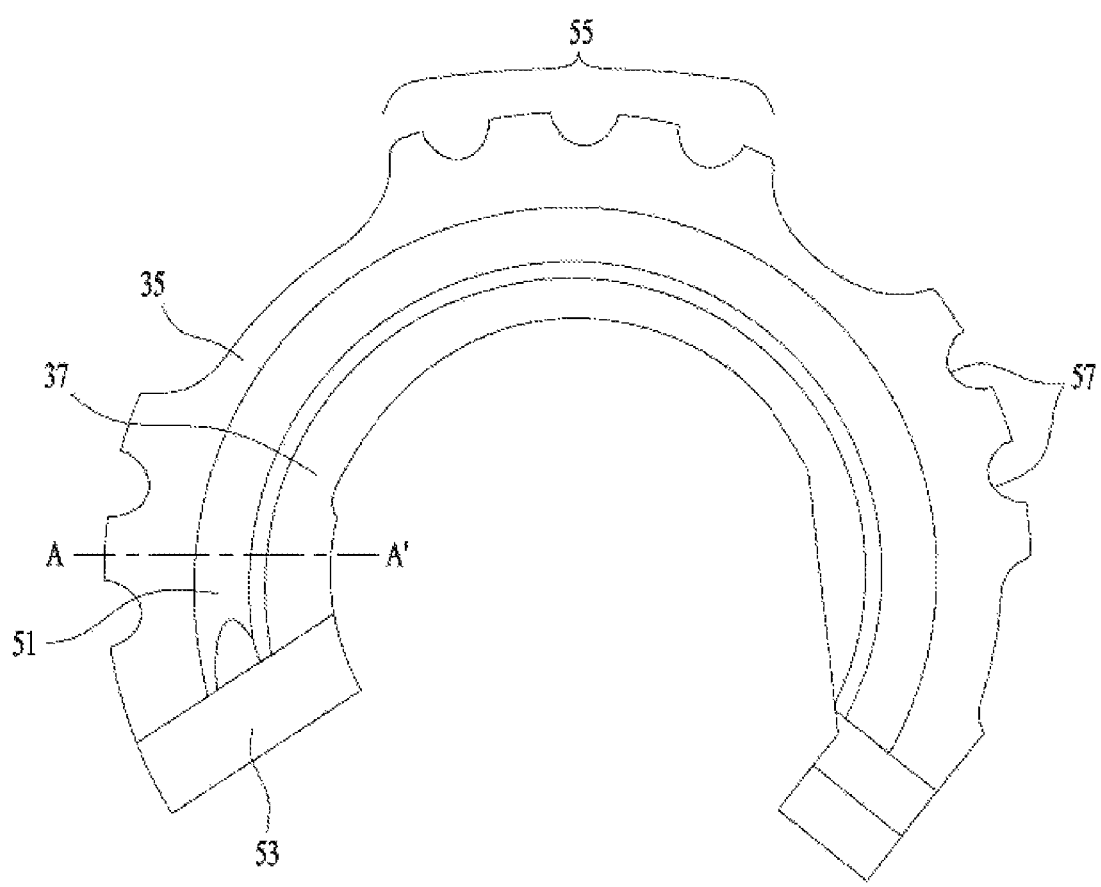
FIG. 3 is a top view of a coil spring pad 31 according to a preferred embodiment of the present disclosure.

FIG. 2 is a perspective view of a coil spring pad for a vehicle suspension system according to a preferred embodiment of the present disclosure.

A coil spring pad 31 of the present disclosure is preferably made of an elastic material, such as rubber, and is formed in an arc shape obtained by cutting a portion of a ring. An accommodating groove 51 is formed on the upper surface 33 of the coil spring pad 31, in which a lower end of the coil spring 10 is inserted and accommodated.

A fundamental structure of the coil spring pad 31 may be configured as being the same as that of a conventional coil spring pad 31 that has been widely used.

In addition, the coil spring pad 31, according to the present disclosure, has a first surface 35 and a second surface 37 separated from each other by the accommodating groove 51 of the upper surface 33, wherein the first surface 35 is inclined downwards in the outward direction and the second surface 37 is inclined downwards in the inward direction, so that foreign substances may flow down without accumulating on the coil spring pad 31.

More specifically, the upper surface 33 of the coil spring pad 31, according to the present disclosure, includes a first surface 35 positioned at an outer portion of the coil spring pad 31 and a second surface 37 positioned at an inner portion of the coil spring pad 31. The first surface 35 is formed to be inclined such that the height thereof is gradually decreased as it goes from the accommodating groove 51 to the outside of the coil spring pad 31, and the second surface 37 is formed to be inclined such that the height thereof is gradually decreased as it goes from the accommodating groove 51 to the inside of the coil spring pad 31.

Since the first surface 35 and the second surface 37 are formed to be uniformly inclined over the entire area of the coil spring pad 31 along the longitudinal direction thereof, foreign substances falling on any place of the upper surface 33 of the coil spring pad 31 may directly flow down without accumulating thereon.

In particular, since a pad extension part 55 covers the whole of the upper surface of the lower seat 71, except for through-holes 73 and convex portions of the lower seat 71, and the pad extension part 55 has an inclined surface extending to the boundary of the through-hole 73, foreign substances can directly flow down without accumulating on the upper surface of the coil spring pad 31.

In addition, pad ends 53 are also formed with surfaces to be inclined downwards so that foreign substances can directly flow down without accumulating on the upper surface of the coil spring pad 31.

Meanwhile, when the coil spring 10 is repeatedly compressed, a force compressing the coil spring pad 31 is applied to a left arc part of the coil spring 10 (i.e. a part corresponding to the left part in the case where a circle is divided into left and right parts about the center of the circle), which is inserted into the accommodating groove 51 of the coil spring pad 31, and then the vertical deformation of the coil spring pad 31 incurs horizontal deformation thereof so that a portion outside the accommodating groove 51 may be pushed outwards with respect to the coil spring pad 31, thereby generating a clearance between the coil spring 10 and the coil spring pad 31. This clearance may be gradually generated in the section from a zero-winding point to a 0.7-winding point, in the counterclockwise direction, where the coil spring pad 31 is provided.

The zero-winding point refers to a reference point on the circumference, and a 1-winding point refers to a point rotated 360 degrees from the reference point. Thus, the zero-winding point is a reference point of the coil spring pad 31, and the 0.7-winding point is a point rotated about 252 degrees from the reference point on condition that one rotation corresponds to 360 degrees.

Accordingly, in order to prevent a clearance from being generated between the coil spring 10 and the coil spring pad 31, the pad extension part 55 is configured to cover the whole of the upper surface of the lower seat 71, except for through-holes 73 and convex portions thereof.

In addition, since the pad extension part 55 formed along the first surface 35 of the upper surface 33 covers the whole of the upper surface of the lower seat 71, except for the through-holes 73 and the convex portions of the lower seat 71, it is possible to prevent the coil spring pad 31 having elasticity from being permanently deformed in the horizontal direction due to repeated compression of the coil spring 10.

Further, since the pad extension part 55 is configured to be inclined downwards in the outward direction, in the same manner as the first surface 35 of the upper surface 33, based on the center of the accommodating groove 51, foreign substances can be easily discharged through the through-holes 73 formed in the lower seat 71.

Since the upper surface 33 of the coil spring pad 3 having the above-described configuration, according to the present disclosure, is formed to be inclined downwards, foreign substances falling on the coil spring pad 31 can directly flow down along the upper surface 33 without accumulating on the upper surface 33 of the coil spring pad 31 because of a slope of the upper surface 33, thereby preventing foreign substances from accumulating on the coil spring pad 31. In addition, it is possible to maintain the shape of the coil spring pad 31 because horizontal deformation of the coil spring pad 31 due to the operation of the coil spring 10 can be prevented by the pad extension part 55.

In particular, since the pad extension part 55 of the coil spring pad 31 covers the whole area of the lower seat 71, except for the through-holes 73 and the convex portions of the lower seat 71, and is formed to be inclined, foreign substances, such as dust, can be easily discharged through the through-holes 73, and foreign substances can be prevented from going into the space between the coil spring 10 and the coil spring pad 31.

In addition, a pad opening 57 of the pad extension part 55 has a shape matching the boundary of the through-hole 73 so that the coil spring pad 31 can completely cover even the boundary of the through-hole 73 of the lower seat 71.

Furthermore, the first surface 35 cannot cover the convex portion of the lower seat 71. Thus, the first surface 35 may have an opening formed inward to the accommodating groove 51 so as to correspond to the convex portion of the lower seat 71.

Figure 4:
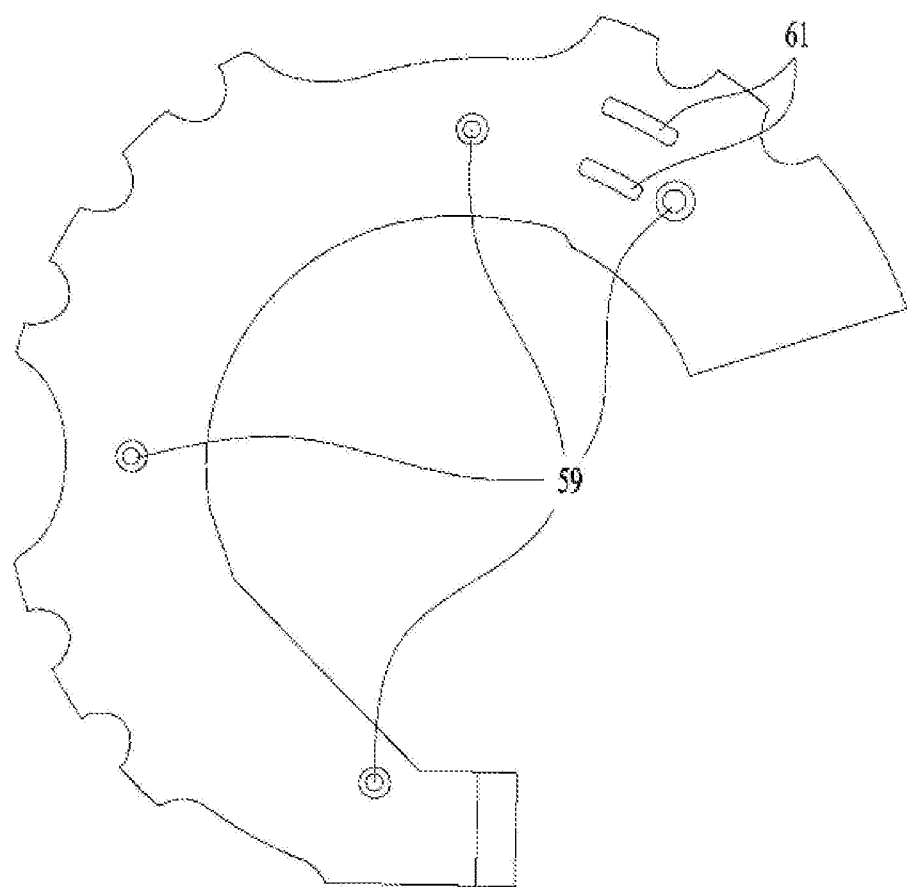
FIG. 4 is a bottom view of a coil spring pad 31 according to a preferred embodiment of the present disclosure.
Figure 5:
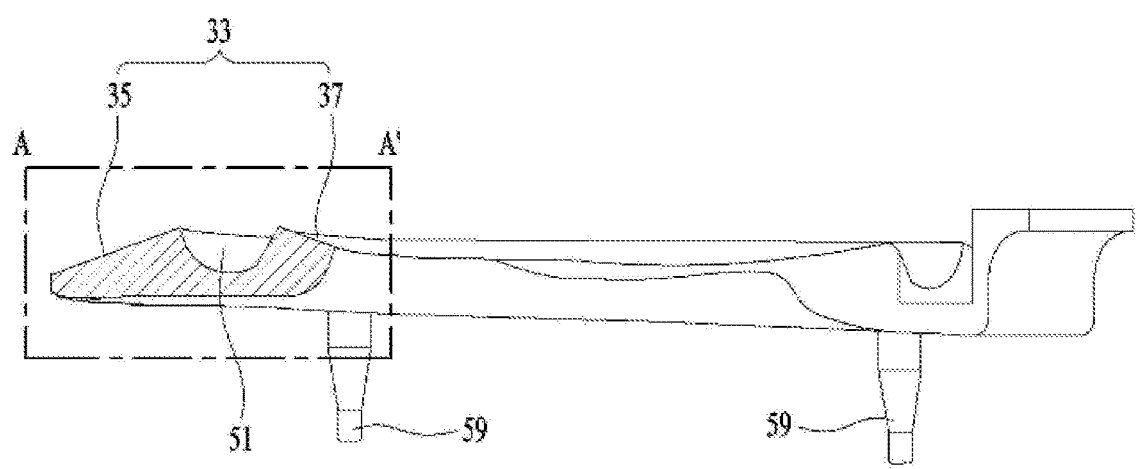
FIG. 5 is a cross-sectional view of a coil spring pad 31 including a section taken along the plane A-A'.
Figure 6:
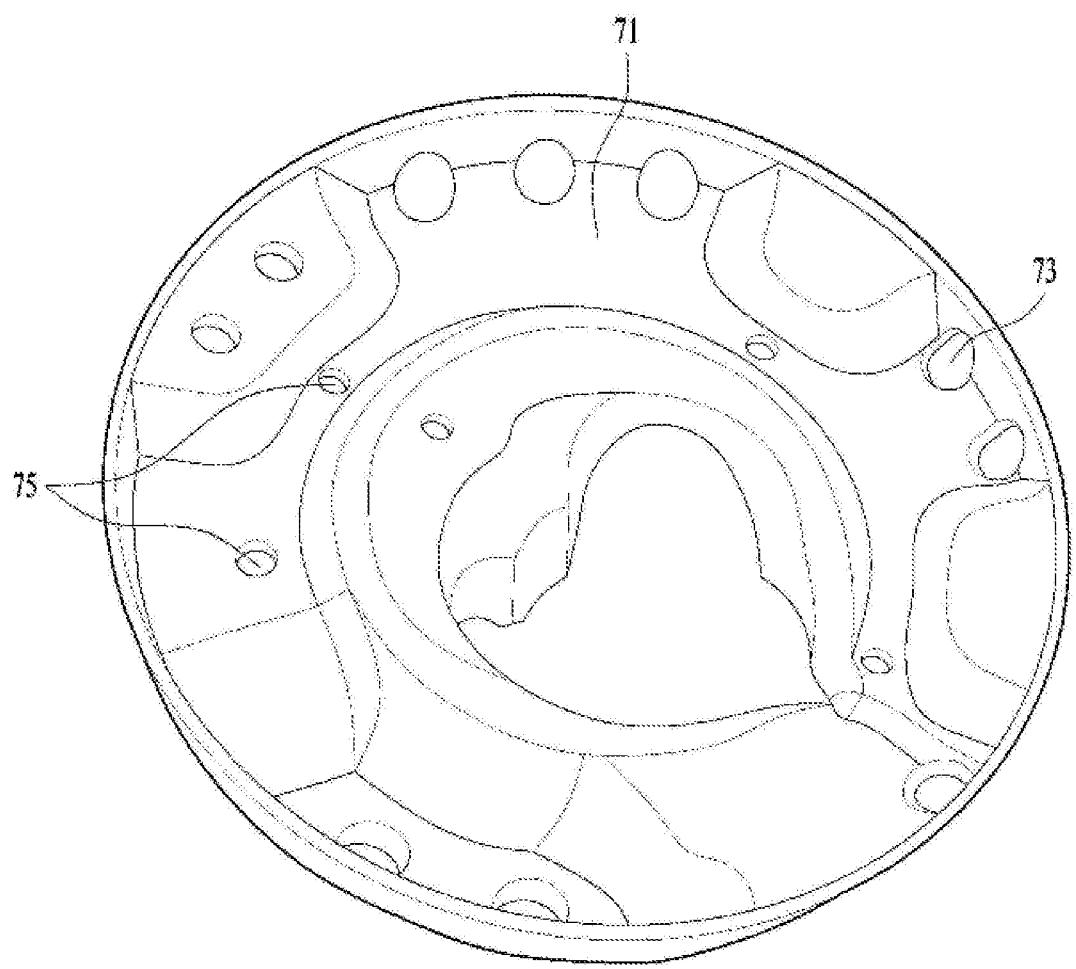
FIG. 6 is a view showing a structure of a lower seat 71 on which a coil spring pad 31 is placed according to the present disclosure.

As shown in FIG. 4, pad fixing portions 59 formed on the lower surface of the coil spring pad 31 are inserted into the pad fixing holes 75 formed in the lower seat 71, thereby fixing the coil spring pad 31 placed on the lower seat 71 so as not to be rotated and twisted due to repeated operation of the coil spring 10.

In addition, as shown in FIG. 4, lower grooves 61 may be formed in a portion where a compression force due to the repeated operation of the coil spring 10 is most concentrated, thereby reducing the deformation of the coil spring pad 31 in the horizontal direction.

When the lower grooves 61 are formed on the lower surface of the coil spring pad 31, the lower grooves 61 may provide an extra space in which the material can be deformed, thereby reducing the horizontal deformation of the coil spring pad 31, compared to the case where the lower grooves 61 are not formed thereon.

As described above, the coil spring pad 31, according to the present disclosure, may suppress accumulation of foreign substances on the upper surface 33 thereof, thereby preventing damage to the coil spring 10. In addition, the pad extension part 55 formed along the first surface 35 of the coil spring pad 31 may prevent the coil spring pad 31 from being deformed in the horizontal direction due to the operation of the coil spring 10, thereby maintaining the shape of the coil spring pad 31.

Although the above embodiment of the present disclosure has been described with reference to the accompanying drawings, those skilled in the art may understand that the present disclosure can be implemented in other specific forms without changing the technical concept or essential features of the present disclosure.

Therefore, it should be understood that the above-described embodiment is only an example, but is not intended to limit the present disclosure. Further, the scope of the present disclosure described in the detailed description shall be defined as the appended claims, and all of changes and modifications resulting from the claims and equivalents thereto should be construed to be included in the scope of the present disclosure.

What is claimed is:

1. A coil spring pad for a vehicle suspension system, comprising:
   an accommodating groove (51) in which a lower end of a coil spring (10) is inserted and accommodated; and
   a pad extension part (55) that is formed from a first surface (35) on an upper surface (33) of the coil spring pad (31) so as to cover the whole area of a lower seat (71), except for through-holes (73) and convex portions of the lower seat (71), thereby preventing the coil spring pad (31) from being deformed in the horizontal direction.

2. The coil spring pad of claim 1, wherein a pad opening (57) of the pad extension part (55) has a semi-circular or semi-elliptical shape corresponding to the shape of the through-hole (73) of the lower seat (71).

3. The coil spring pad of claim 1, wherein the pad extension part (55) of the coil spring pad (31) completely surrounds the through-hole (73) and is formed to be downwardly inclined toward the through-hole (73) based on the accommodating groove (51).

4. The coil spring pad of claim 1, wherein pad, ends (53) of the coil spring pad (31) are formed to be inclined downwards.

5. The coil spring pad of claim 1, further comprising pad fixing portions (59) for fixing the coil spring pad (31) to pad fixing holes (75) of the lower seat (71).

6. The coil spring pad of claim 1, further comprising lower grooves (61) providing an extra space for reducing the horizontal deformation of the coil spring pad (31) due a compression force applied by the vertical operation of the coil spring (10).

\* \* \* \* \*